United States Patent Office 3,320,518
Patented May 16, 1967

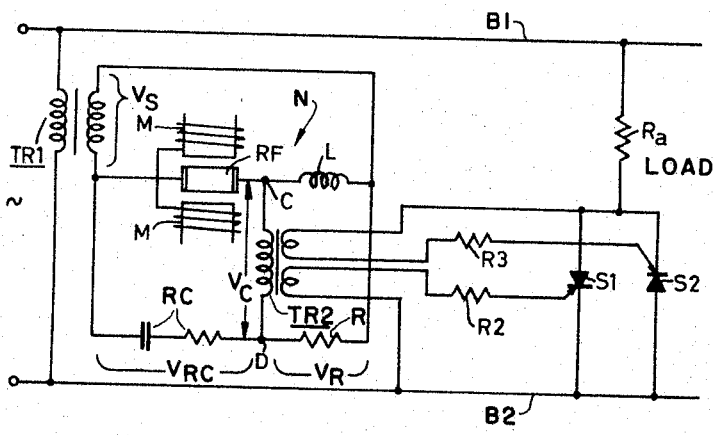
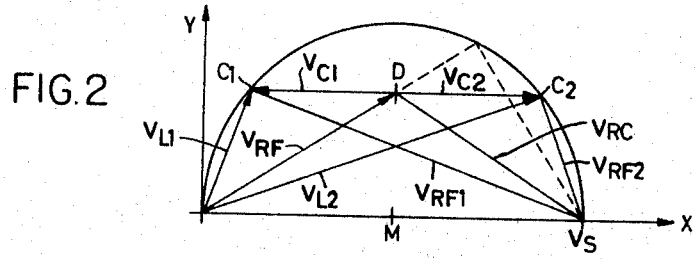
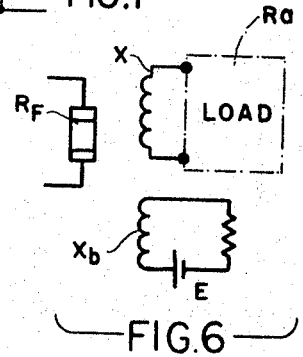
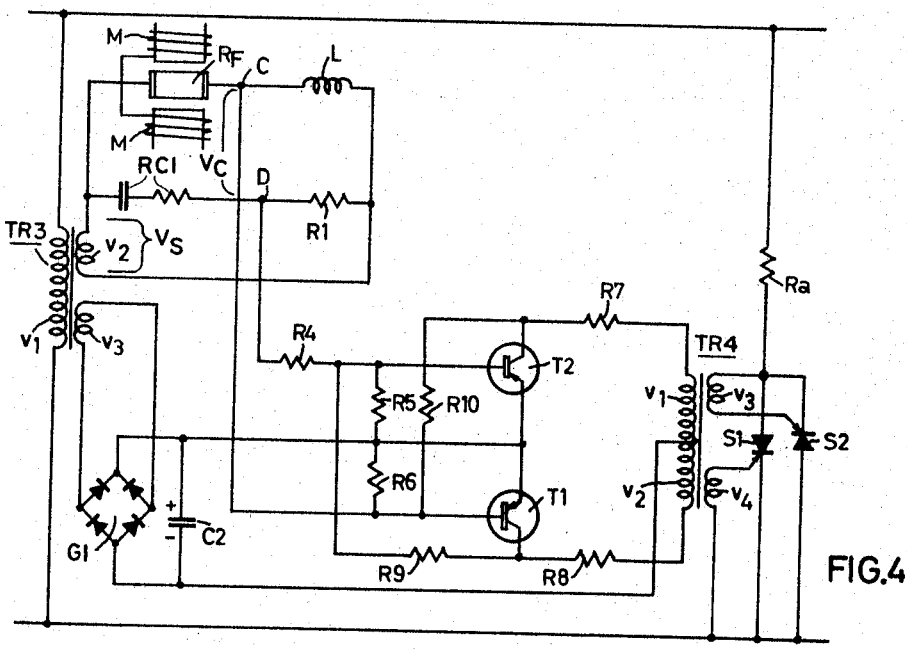

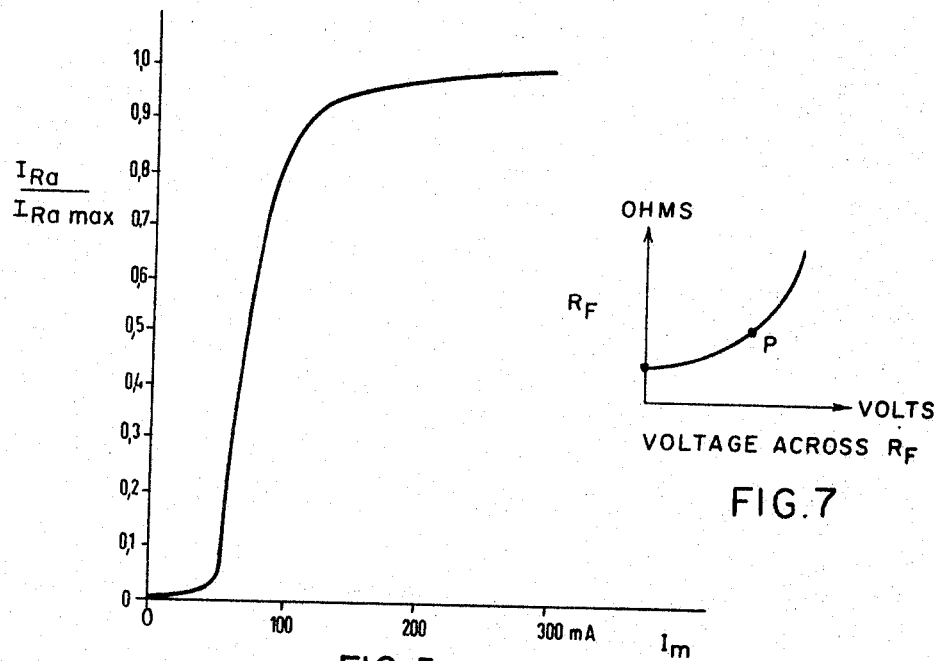
FIG. 5
FIG. 7
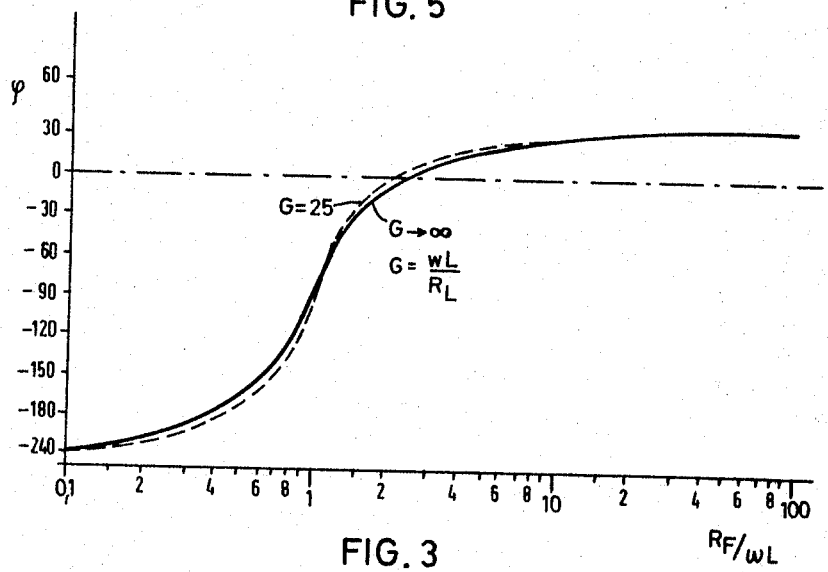
FIG. 3

3,320,518
SWITCHED REGULATOR WITH MAGNETIC FIELD RESPONSIVE PHASE CONTROL DEVICE
Herbert Weiss, Nurnberg, Germany, assignor to Siemens-Schuckertwerke Aktiengesellschaft, Berlin-Siemensstadt and Erlangen, Germany, a corporation of Germany
Filed Dec. 19, 1963, Ser. No. 331,654
Claims priority, application Germany, Jan. 30, 1963, S 83,488
4 Claims. (Cl. 323—19)

My invention relates to systems for controlling the firing angle of electronic switching devices, such as semiconductor controlled rectifiers, so as to control or regulate the alternating voltage or current supplied through these devices from an alternating voltage supply.

Such control is accomplished by supplying the gate or firing electrode of the electronic switching device with alternating voltage or current whose frequency is identical with that of the feed voltage but whose phase position can be varied through an angle of at least 180° with respect to the phase of the feeder voltage. In many cases, the phase position of the gate control voltage is to be varied in dependence upon an operating parameter or condition existing in the plant or circuitry which receives the current. If this operating parameter, which is to be extracted for regulating the phase-angle control of the firing circuit, constitutes a high direct voltage, a direct current produced by a high voltage, or an extremely high direct current, it is necessary to provide special isolating means or direct current conversion equipment for potential separation and matching.

It is an object of my invention to devise a phase control system, for firing electronic switches and alternating current circuits, that eliminates or greatly minimizes the need for potential-isolating equipment under operating conditions of the above-mentioned kind, as well as for other cases where it is desirable electrically to separate the phase-angle control system of the semiconductor switching devices from the system that furnishes the primary controlling pilot signal.

A broader object of this invention is to provide a system for galvanically separating a parameter, for example a high voltage or high current, from a sensor which is to extract a value corresponding to the parameter for regulating or other purposes, for example by a transistor amplifier, while avoiding the ordinarily necessary special insulating means or direct current conversion equipment for potential separation. Another object related to the latter is to provide matching between two systems having different impedances.

According to a feature of my invention, I subject a galvanomagnetic resistor to a flux depending upon the parameter to be measured and connect the resistor into the circuit which is to use the value. More particularly, I match two systems by connecting a field coil having a resistance matching the first system into the first system, and subject a galvanomagnetic resistor having an impedance corresponding to the input impedance of the second system to the flux of the field coil. I can select the resistance of the semiconductor member by its size, or by adding a second field coil, having a predetermined current flowing therethrough and therefore a predetermined flux, so as to bias the galvanomagnetic resistor to a particular resistance value about which it may fluctuate in dependence upon the flux from the first field coil. Because of the curvature of the resistance value relative to the flux applied, I am able to regulate with this biasing means not only the absolute resistance value of the galvanomagnetic resistor but also its resistivity, namely its sensitivity to the flux.

By virtue of this galvanomagnetic resistor I am able to utilize the ordinary circuitry of the second system to be controlled and I am also able to construct the resistor to have a particular temperature dependence corresponding to or opposite to the temperature dependence of the second system, for example the transistors of the second system.

According to another feature of my invention, the primary control member that determines the phase angle of the firing moment in the electronic switching devices relative to the cycle of the alternating feeder voltage is constituted by a magnetic field responsive resistor, and this "galvanomagnetic resistor" is connected in one branch of an alternating current-energized bridge network whose output diagonal contains the primary winding of a control-voltage transformer, a fixed ohmic resistor being connected in the opposite branch of the network so as to form a series connection with the galvanomagnetic resistor and the transformer primary winding between two input diagonal points. Connected in the two remaining branches of the network are an inductance member and a resistance-capacitance series group, respectively. The energizing voltage for the bridge network is derived from the alternating voltage supply means for the load circuit to be controlled, and this load circuit contains the electronic switching devices, preferably semiconductor controlled rectifiers, whose gate circuits are connected to secondary windings of the above-mentioned control-voltage transformers to be energized by the output of the bridge network, the phase position of this output being dependent upon the variable and magnetic field responsive resistance of the galvanomagnetic member.

Galvanomagnetic resistors, also called "magneto-resistive" members, are semiconductor devices in which, by virtue of design and geometric features, the occurrence of the Hall effect is suppressed or fully eliminated, with the result that the ohmic resistance of the device increases greatly in response to a magnetic field acting upon the device. Galvanomagnetic resistors are known from U.S. Patent 2,894,234 of H. Weiss and H. Welker, assigned to the assignee of the present invention. The preferred resistance materials for such resistors are indium arsenide and indium antimonide, especially the latter material, which is used in the devices available from the assignee in form of elongated prismatic bodies having terminals at the respective ends (field plates), as well as in form of circular discs having one terminal in the center and the other terminal along the periphery (field discs), both types of galvanomagnetic resistors being more fully described in the above-mentioned patent.

The invention will be further explained with reference to embodiments of control systems according to the invention illustrated by way of example in the accompanying drawings. However, it will be obvious to those skilled in the art that other modifications and applications of the invention are available and thus permit embodying the invention in a manner different from that particularly illustrated and described hereinafter, without departing from the essential features of my invention and within the scope of the claims annexed to this specification and forming a part thereof. In the drawings:

FIG. 1 is a schematic circuit diagram of a first embodiment of the switched regulator of the present invention.

FIG. 2 is an explanatory vector diagram relating to the controlling bridge network that forms part of the system shown in FIG. 1.

FIG. 3 is an explanatory graph relating to the control performance of the system shown in FIG. 1.

FIG. 4 is a schematic circuit diagram of another embodiment of the switched regulator of the present invention.

FIG. 5 is an explanatory graph relating to the performance of the system shown in FIG. 1.

FIG. 6 shows an arrangement according to the invention for altering the structure of FIGS. 1 and 2.

FIG. 7 is a graph illustrating the operation of the device in FIG. 6.

In FIG. 1, a load resistor $R_a$ is connected in series with two anti-parallel electronic switches S1 and S2, such as silicon controlled rectifiers, which control the power supplied to the load $R_a$ from two buses B1 and B2 of an alternating voltage feed line. The gate control current for the two controlled rectifiers S1 and S2 is derived from the same alternating voltage line by means of a transformer TR1 whose secondary winding constitutes a voltage source having a value $V_S$ for a complex bridge network N. Connected between the output diagonal points C and D of the network N is the primary winding of a control voltage transformer TR2 which has two secondary windings separately connected across the gate-cathode path of the SCR devices S1 and S2, respectively. Resistors R2 and R3 are connected in series between the gate electrode of each SCR and the appertaining secondary winding. The diagonal point C of the bridge network is connected through an inductance coil L with one end of the secondary winding of the transformer TR1, and the diagonal point D of the network is connected through a fixed ohmic resistor R with the same end of the secondary winding. The other end of the secondary winding of the transformer TR1 is connected through a magnetic field responsive resistor $R_F$ to the diagonal point C, and through a resistor-capacitor series connection RC to the diagonal point D. A control voltage $V_C$ is formed between the points C and D and is used for regulating the current gates. The magnetically dependent resistor $R_F$ is located in the air gap of an electromagnet M, for example as illustrated in FIG. 1. The resistor $R_F$ is in the form of a flat plate of indium antimonide as disclosed in United States Patent 2,894,234.

The galvanomagnetic resistor may also be mounted in the magnetic field of the direct current bus bar or other high voltage equipment so that the magnetic field acting upon the plate and determining its effective resistance is proportional to the direct current passing through the bus bar. As a result, no further isolating equipment is needed for separating the electronic switch-control system according to the invention from the high voltage system that furnishes the pilot signal.

The following values are suitable for the system as exemplified by FIG. 1:

TR1: Primary voltage 220 v., frequency 50 or 60 c.p.s.; secondary voltage 50 v.
$L = 1.08$ henrys
$RC = 12$ μf., 960 ohms
$R = 285$ ohms
$R2 = R3 = 30$ ohms The vector diagram of the bridge network, shown in FIG. 2, denotes the voltage drops at the respective bridge components by vectors identified by V with a subscript similar to the reference character employed for identification of the particular circuit component. The voltage vectors V in FIG. 2 may also employ final numeral subscripts, e.g. $V_{L1}$, $V_{L2}$, which subscripts distinguish various voltages, e.g. $V_L$, across the same elements, e.g. L, from each other. According to the diagram, the voltage drops $V_R$ at the resistor R and $V_{RC}$ occurring at the resistor-capacitor combination form together a vectorial sum which corresponds to the voltage $V_S$ of the secondary winding in transformer TR1, this voltage being placed in the X-axis. In this embodiment, the reactance of the resistor-capacitor combination RC coincides with the resistance value of the fixed resistor R, so that the potential of the diagonal point D is at $$X = \frac{V_s}{2}$$

The Y-coordinate of this point D depends upon the resistance ratio of the ohmic resistance value of the resistor-capacitor series combination RC relative to the resistance value of the appertaining capacitor. The voltage drops in the other bridge branches are added in the same manner so that the geometric sum of the voltage drop $V_L$ at the inductivity plus the voltage drop $V_{RF}$ at the magnetogalvanic resistor $R_F$ always results in the bridge-energizing voltage $V_S$. The locus of voltages of the diagonal point C for a variable magnetogalvanic resistor $R_F$ is a circle through the zero point, the center of the circle being located on the X-axis at $$X = \frac{V_s}{2}$$

The voltage vectors $V_L$ and $V_{RF}$ are entered in the vector diagram for two resistance values of the magnetogalvanic resistor $R_F$. The control voltage $V_C$, impressed upon the primary winding of transformer TR2 in the bridge output diagonal between points C and D, changes its phase position in dependence upon the resistance value of the galvanomagnetic resistor $R_F$, so that a relatively slight change in the magnetic field, to which the resistor $R_F$ is exposed, can shift the phase position of the voltage in the bridge output diagonal by 180°. The transformer TR2 adapts this voltage to the internal resistance of the gate circuits that control the respective SCR devices, and for isolating the potentials of the individual gate control circuits.

The curves in the graph of FIG. 3 each show (on the ordinate) the phase angle $\varphi$ between the no-load (open circuit) control voltage $V_C$ (i.e. between C and D) and the voltage $V_S$ (across the secondary of TR1) as a function of $R_F/\omega L$ for various values of $G = \omega L/R_L$, where $R_L$ is the resistance of coil L, $R_F$ is the resistance value of the magnetic field responsive resistor $R_F$ and $\omega L$ is the reactance of coil L. Thus $G = 25$ characterizes a coil whose inductive reactance of 25 times its resistive loss. G approaching infinity characterizes a coil of negligible resistance. In FIG. 3, if resistance $R_F$ is raised approximately six times from 0.5 to 3 on the abscissa, the unloaded bridge voltage is shifted over an angle of 180° relative to voltage $V_C$.

FIG. 5 illustrates the dependence, in the operation of the circuit of FIG. 1, of the load current through $R_a$ upon the current of the magnet operating upon the field-dependent resistor $R_F$. The ordinate is calibrated in values of current $I_{Ra}$ through resistor $R_a$ relative to the maximum current $I_{Ra\ max}$, i.e. $I_{Ra}/I_{Ra\ max}$. The abscissa is calibrated in units of magnetizing current $I_m$ through the magnet operating on $R_F$. In FIG. 1, as shown in FIG. 5, as the current $I_m$ increases, the relative current $I_{Ra}/R_a\ max$, through resistor $R_a$ also increases. A reverse drooping characteristic can be obtained by substituting a capacitor in the phase bridge for the inductance L and substituting an inductance for the capacitor in the bridge branch RC.

The more elaborate system shown in FIG. 4 is based upon that of FIG. 1 and achieves a more rapid control performance by the interposition of a bistable transistor network. Corresponding components are denoted by the same reference characters in both illustrations.

In contrast to FIG. 1, the output diagonal between the points C and D of the bridge network comprises, in lieu of the primary winding of transformer TR2, a series connection of three resistors R4, R5 and R6. The circuit point between the two resistors R5 and R6 forms a common point with the emitters of two parallel connected transistors T1 and T2 of a bistable transistor network. Respective collector resistors R7 and R8 connect the collectors of the transistors to the respective ends of the primary winding in the transformer TR4. A mid-tap on the primary winding is connected to the minus pole of a full-wave rectifier G1 energized from a secondary winding of a transformer TR3 and forming the power source of this bistable device. The plus polt of the rectifier G1 is connected, together with the emitter leads of the transistors T1 and T2, to the connecting point betwen the resistors R5 and R6. A smoothing capacitor C2 is connected parallel to the rectifier G1. The junction point between the resistors R4 and R5 is directly connected with the base of transistor T2 and is connected through a feedback resistor R9 with the collector of the transistor T1. The resistor R6 of the series group R4, R5, R6 is connected to the diagonal point C of the bridge network which is also in direct connection with the base of transistor T1 and is connected through a feedback resistor R10 with the collector of transistor T2. The circuit components may be given the following rating, for example:

$R_F$=80–100 ohms basic resistance (no magnetic field)
L=0.59 henry
RC1=4.6 μF.; 250 ohms
R1=760 ohms
TR3=Primary voltage 220 v., frequency 50 or 60 c.p.s., secondary voltages $u_2$=6 v., $u_3$=9 v.
R4=R5=R6=3 kilohms
R7=R8=100 ohms
R9=6 kilohms
R10=17 kilohms
G1=Rectifier bridge Siemen Type B30, C250
T1, T2: Transistor Siemen Type TF65 or AC151
TR4: Siemens Type No. 59/T4/T4; core outer diameter 34 mm., core height 2 x 14 mm., no air gap; $n_1$=$n_2$=800 turns, 0.08 mm., diameter, varnished copper wire; $n_3$=$n_4$=250 turns, 0.3 mm. diameter, varnished copper wire.

In the system according to FIG. 4, the control voltage between the bridge output diagonal points C and D, of which coresponding voltage shares are taken from the respective resistors R5 and R6, is suppled to the input circuits of the transistor T1 and T2 such that one of these transistors is conducting and the other transistor is blocking at one time. Consequently, the direct voltage source, constiuted by the rectifier G1, powers the two transistors T1, T2 so as to produce in the core of transformer TR4 on alternating flux which depends upon the frequency and phase position of the control voltage between the bridge diagonal points C and D. The control voltage at the bridge diagonal drives only the very small control current for the transistors so that the galvanomagnetic resistor $R_F$ can be less sensitive or the magnetic field used for controlling this resistor may be of smaller intensity, or both. For example, the energy content of a considerably smaller electromagnet would then be sufficient for current control. As a result, for a particular magnetic field control power, a very small time constant is achieved, amounting for example to about 4 m. sec. at 1 w. controlling power.

The dependence of this gate control system upon a magnetic field also renders the system applicable for use in direct current machines for the purpose of effecting contactless commutation. In this case, the magnetic field resistor is placed in a magnetic field whose induction depends upon the position of the stator relative to the rotor of the machine, whereas the electronic switching devices are connected in, or serve to control, the feeder circuit for the operating windings of the electric machine.

Systems according to the invention are also applicable as magnetically responsive switching devices which operate when the galvanomagnetic resistor enters into a magnetic field of a permanent magnet or electromagnet, as is the case for example with various known signalling systems and destination-identifying control systems for marshalling and similar conveying purposes that require distribution of various travelling objects to given destinations under control by switching operations which an electronic switching system according to the present invention can readily perform in response to its galvanomagnetic sensing member as a travelling magnet passes by.

FIG. 6 shows a more general aspect of the invention which may be applied to the circuits of FIGS. 1 and 4. In FIG. 6, the galvanomagnetic resistor $R_F$ is subjected to a coil X having a flux corresponding to a parameter to be measured, for example, the current in $R_a$, and a second coil $X_b$ for biasing the resistor to an initial resistance. A variable source voltage E produces this flux. The parameter applied to the coil X may then vary the resistance of the resistor $R_F$ about the predetermined biasing point established by the flux of the biasing coil $X_b$. The resistor $R_F$, so biased, can be inserted to replace the resistor $R_F$ in FIGS. 1 and 2.

FIG. 7 illustrates the change in resistance of a galvanomagnetic resistor relative to the flux aplied thereto. The point P on the curve illustrates the resistance to which the coil X has biased the resistor $R_F$ in FIG. 1.

I claim:

1. A regulator comprising a magnetic field responsive system for controlling electronic switches in alternating current circuits, said magnetic field responsive system, comprising alternating voltage supply means, a load circuit connected to said supply means and containing electronic switch means having gate circuit means for controlling the firing moment relative to the alternating voltage cycle, a four-branch bridge network having input diagonal points responsive to said supply means and output diagonal points to be energized in a phase relation to the alternating current at said supply means, a magnetic field responsive controlling resistor in one of the four branches of said network, a normally fixed resistance member connected in a network branch opposite to said controlling resistor, an inductance member and a resistance-capacitance in said remaining two branches respectively, a control voltage transformer having a primary winding connected across the output diagonal points of said bridge network, said transformer having secondary winding means connected to said gate circuit means for controlling said electronic switch means in dependence upon magnetically responsive resistance changes of said resistor.

2. A regulator comprising a magnetic field responsive system for controlling electronic switches in alternating current circuits, said magnetic field responsive system, comprising alternating voltage supply means, a load circuit connected to said supply means and containing anti-parallel connected semiconductor switching devices having respective gate circuit means for controlling the firing moment relative to the alternating voltage cycle, a four branch bridge network having input diagonal points responsive to said supply means and output diagonal points to be energized in a phase relation to the alternating current, a magnetic field responsive controlling resistor in one of the four branches of said network, a normally fixed resistance member connected in the opposite network branch, an inductance member and a resistance-capacitance member in said remaining two branches, respectively, a control voltage transformer having a primary winding connected with the output diagonal of said bridge network, said transformer having secondary windings connected with said gate circuit means of said respective semiconductor switching devices.

3. A regulator comprising a magnetic field responsive system for controlling electronic switches in alternating current circuits, said magnetic field responsive system, comprising alternating voltage supply means, semiconductor switching devices connected to said supply means, said semiconductor switching devices having respective gate circuit means for controlling the firing moment relative to the alternating voltage cycle, a four branch bridge network having input diagonal points responsive to said supply means and output diagonal points to be energized in a given phase relation to the alternating current, a magnetic field responsive controlling resistor in one of the four branches of said network, a normally fixed resistance member connected in the opposite network branch, an inductance member and a resistance-capacitance circuit in said remaining two branches, respectively, a bistable flip-flop network having two parallel-connected transistors having input and output electrodes with respective load circuits connected to the output electrodes of said transistors and respective trigger circuits connected to the input electrodes of said transistors, circuit means connecting said trigger circuits between the output diagonal points of said bridge network, a control voltage transformer having a primary winding having two ends each connected to an output electrode of a corresponding one of said transistors and a mid-tap, direct voltage supply means having one pole connected to the mid-tap of said primary winding and another pole connected to input electrodes of said transistors, said transformer having secondary windings connected to said gate circuit means of said respective semiconductor switching devices.

4. A regulator comprising a magnetic field responsive control system for electronic switches as claimed in claim 1, wherein said fixed resistance member and said resistance-capacitance connection are connected to one and the same output diagonal point of said bridge network and hence in direct series relation to each other, and the reactive impedance of said resistance-capacitance connection has a value substantially equal to the resistance value of said fixed resistance member.

References Cited by the Examiner
UNITED STATES PATENTS

| | | | |
|---|---|---|---|
| 1,810,539 | 6/1931 | Sokoloff | 338—32 X |
| 2,946,955 | 7/1960 | Kuhrt. | |
| 2,979,668 | 4/1961 | Dunlap | 338—32 X |
| 2,982,906 | 5/1961 | Green. | |
| 3,142,781 | 7/1964 | Izenour | 315—194 |
| 3,176,215 | 3/1965 | Kusko | 323—24 |
| 3,259,832 | 7/1966 | Summerer | 323—4 |

JOHN F. COUCH, *Primary Examiner.*

W. E. RAY, A. D. PELLINEN, *Assistant Examiners.*